United States Patent [19]
Smith et al.

[11] Patent Number: 6,113,342
[45] Date of Patent: Sep. 5, 2000

[54] SELF-ALIGNING BATTERY CHANGING SYSTEM FOR ELECTRIC BATTERY-POWERED VEHICLES

[75] Inventors: Timothy W. Smith, Abingdon; Melvin E. Scott, Christiansburg; Fred D. Boyd, Pounding mill, all of Va.

[73] Assignee: Long-Airdox Company, Oak Hill, W. Va.

[21] Appl. No.: 09/133,073

[22] Filed: Aug. 12, 1998

[51] Int. Cl.[7] .............................. B66C 23/00; B60R 16/04
[52] U.S. Cl. ......................... 414/680; 414/917; 180/68.5
[58] Field of Search .................................. 414/680, 685, 414/917; 180/68.5, 65.1

[56] References Cited

U.S. PATENT DOCUMENTS

| | | |
|---|---|---|
| 3,360,143 | 12/1967 | Allen . |
| 3,734,329 | 5/1973 | Grelck . |
| 3,834,563 | 9/1974 | Teti . |
| 3,966,064 | 6/1976 | Felburn . |
| 4,065,013 | 12/1977 | Orthman ................................. 414/607 |
| 4,065,015 | 12/1977 | Radakovich . |
| 4,167,366 | 9/1979 | DeVivo . |
| 4,397,365 | 8/1983 | Harbe et al. ........................... 180/68.5 |
| 4,402,645 | 9/1983 | Broderick et al. . |
| 4,538,953 | 9/1985 | Abramson . |
| 4,547,118 | 10/1985 | Pittenger . |
| 4,692,085 | 9/1987 | Parsons . |
| 5,040,815 | 8/1991 | Evans . |
| 5,163,537 | 11/1992 | Radev . |
| 5,226,777 | 7/1993 | Radev . |
| 5,238,357 | 8/1993 | Patrick et al. ........................... 414/420 |
| 5,256,023 | 10/1993 | Patrick et al. ........................... 414/420 |
| 5,275,525 | 1/1994 | Grumblatt . |
| 5,462,439 | 10/1995 | Keith ...................................... 180/65.1 |
| 5,598,083 | 1/1997 | Gaskins ................................... 414/546 |
| 5,664,932 | 9/1997 | Clonch et al. .......................... 414/680 |
| 5,810,106 | 9/1998 | McCoy . |

FOREIGN PATENT DOCUMENTS

| | | |
|---|---|---|
| 0192994 | 1/1986 | European Pat. Off. . |
| 1107983 | 10/1964 | United Kingdom . |
| 1001535 | 9/1965 | United Kingdom . |
| 2254309 | 2/1992 | United Kingdom . |
| 2255755 | 4/1992 | United Kingdom . |
| 2263452 | 1/1993 | United Kingdom . |

*Primary Examiner*—Robert P. Olszewski
*Assistant Examiner*—Bryan Jaketic
*Attorney, Agent, or Firm*—Piper Marbury Rudnick & Wolfe

[57] ABSTRACT

A battery and battery lifting system for a mining or construction vehicle, the vehicle having a frame, the system having a battery, the battery having at least one slot, the at least one slot having vertical sidewalls which extend toward convergence, and at least one wedge-shaped arm for lifting the battery, the at least one wedge-shaped lifting arm having a bellcrank and a leveling arm for pivotally coupling to the frame, whereby the at least one wedge-shaped lifting arm is guided and aligned with the battery as the at least one wedge-shaped lifting arm moves inwardly in the direction of convergence along the vertical sidewalls. The at least one wedge-shaped lifting arm having a hydraulic cylinder. The hydraulic cylinder having a shaft with a locking plate located at the end of the shaft. The locking plate is used to lock the battery to the at least one wedge-shaped lifting arm.

13 Claims, 7 Drawing Sheets

SELF-ALIGNING BATTERY CHANGING SYSTEM FOR ELECTRIC BATTERY-POWERED VEHICLES

TECHNICAL FIELD

This invention relates generally to battery changing systems for electric battery-powered vehicles and more particularly to battery changing systems for electric battery-powered underground mining vehicles.

BACKGROUND ART

Underground mining vehicles such as scoops, haulers, equipment movers, etc., powered by electric batteries are well known in the art. In the present battery technology, a fully charged battery normally provides electrical energy for the operation of an underground mining vehicle during one working shift of eight hours. The time necessary for charging a battery is about eight hours. A cooling period of eight hours after the charging is usually recommended for improving the battery performance. Thus, the battery of a vehicle working more than one shift in a 24 hour period has to be charged after every shift. However, for continuous operation of a battery-powered vehicle after the battery has been discharged requires replacement by a charged battery.

During operation of the vehicle, the battery is secured to the structure of the vehicle which supports the battery. However, the vehicle has a battery changing system, usually using hydraulic power, for moving the battery up and down during a battery changing operation. The combination of the vertical motion of the battery provided by the battery changing system and the horizontal motion of the vehicle itself, enables the operator to unload the discharged battery from the vehicle and to load a fresh battery onto the vehicle.

There are different types of battery changing systems, in relation with the battery support, which are well known in the art. In one type of battery changing system the battery is loaded on and secured to a battery support, such as a fork, or a platform, or a "U" shaped structure, etc., which battery support, under the action of vertical hydraulic cylinders, moves up and down during a battery changing operation. The battery support is guided to move in the vertical direction by two parallel members attached firmly to the main frame of the vehicle. The type of battery changing system is similar to the well known load-lifting system of a fork-lift truck. The major disadvantages of this type battery changing systems are: first, the vertical travel of the battery is very short, because the lengths of the vertical hydraulic cylinders and parallel guides are limited by the height of the vehicle main frame, which in most cases is very short; and second, the parallel guides of the battery support are complicated and unreliable because it is difficult to keep them clean in an underground mine environment.

U.S. Pat. No. 5,163,537 and U.S. Pat. No. 5,226,777 both to Radev, disclose a battery changing system for electric battery-powered vehicles having a mainframe. The systems each include a bellcrank for connecting a battery support with the mainframe, an eyebar link for connecting the battery support to the mainframe in parallel with the bellcrank, and a hydraulic cylinder for pivoting the bellcrank. The battery support includes a fork for lifting the battery.

U.S. Pat. No. 5,275,525 to Grumblatt and U.S. Pat. No. 5,664,932 to Clonch et al. disclose battery changing systems which include parallel arms pivotally mounted to the vehicle frame and adapted to be aligned along the sides of the battery. The arms include supports with upward facing surfaces for engaging and lifting the battery.

The prior art battery changing systems require the lifting arms to be aligned with the battery, which in turn requires the vehicle to be maneuvered and aligned with the battery. The prior art systems have been found to be difficult and slow to align. Further, misalignment has caused component breakage. In addition, the prior art batteries occasionally bounce on the lifting arms during transport. Such movement of the battery is unsafe and can also lead to system failure.

The foregoing illustrates limitations known to exist in present battery changing systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

It is an object of the present invention to provide a battery changing system which allows fast and reliable changing of the vehicle battery.

It is still a further object of the present invention to provide a battery changing system which avoids component breakage.

Still a further object of the present invention is to provide a battery changing system which provides self alignment of the battery and vehicle.

Yet still another object of the present invention is to provide a battery changing system which maintains the position of the battery on the lifting arms during lifting and transport operations.

The present invention therefore provides a battery and battery lifting system for a mining or construction vehicle, the vehicle having a frame, the system having a battery, the battery having at least one slot, the at least one slot having vertical sidewalls which extend toward convergence, and at least one wedge-shaped arm for lifting the battery, the at least one wedge-shaped lifting arm having a bellcrank and a leveling arm for pivotally coupling to the frame, whereby the at least one wedge-shaped lifting arm is guided and aligned with the battery as the at least one wedge-shaped lifting arm moves inwardly in the direction of convergence along the vertical sidewalls. The at least one wedge-shaped lifting arm having a hydraulic cylinder. The hydraulic cylinder having a shaft with a locking plate located at the end of the shaft. The locking plate is used to lock the battery to the at least one wedge-shaped lifting arm.

BRIEF DESCRIPTION OF THE DRAWING FIGURES

DESCRIPTION OF THE PREFERRED EMBODIMENT

The present invention is an improvement of the battery changing system disclosed in U.S. Pat. No. 5,163,537 issued to Radev and presently assigned to the instant assignee, Long-Airdox Company. U.S. Pat. No. 5,163,537 is incorporated herein by reference.

Figure 1:
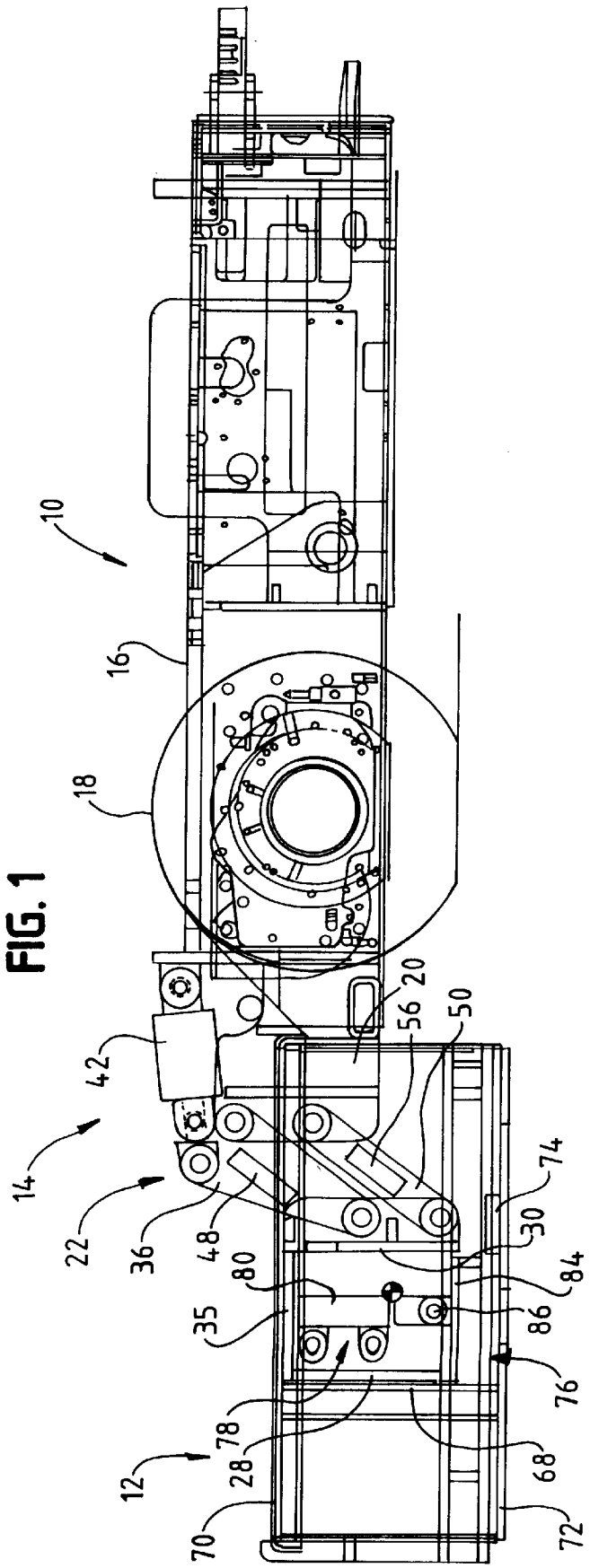
FIG. 1 is a side view of the vehicle and battery of the battery lifting system of the present invention, with the lifting arms of the vehicle in a lowered position.

Referring to FIG. 1, the battery lifting system of the present invention is shown. In particular, a mining or construction vehicle 10 and battery 12 are shown to include a battery lifting system 14. The battery lifting system 14 and battery 12 are shown in a lowered position prior to lifting the battery 12.

Figure 2:
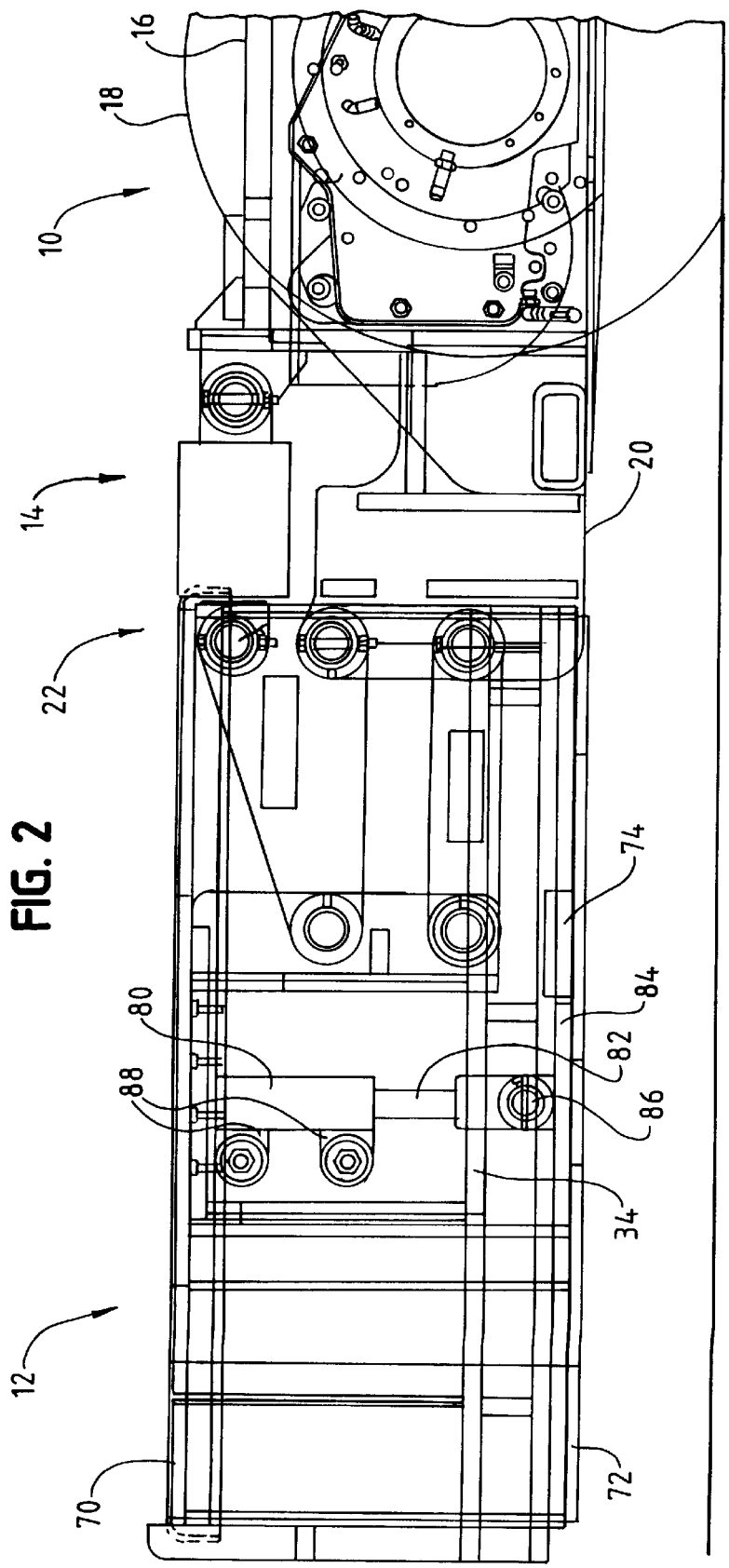
FIG. 2 is an enlarged view of a portion of the system shown in FIG. 1 and with the lifting arms in a raised position.

FIG. 2 shows the battery lifting system 14 and battery 12 in a raised position. The vehicle 10 includes a main frame 16 and tires 18. The main frame 16 includes an extended frame bracket 20.

Figure 3:
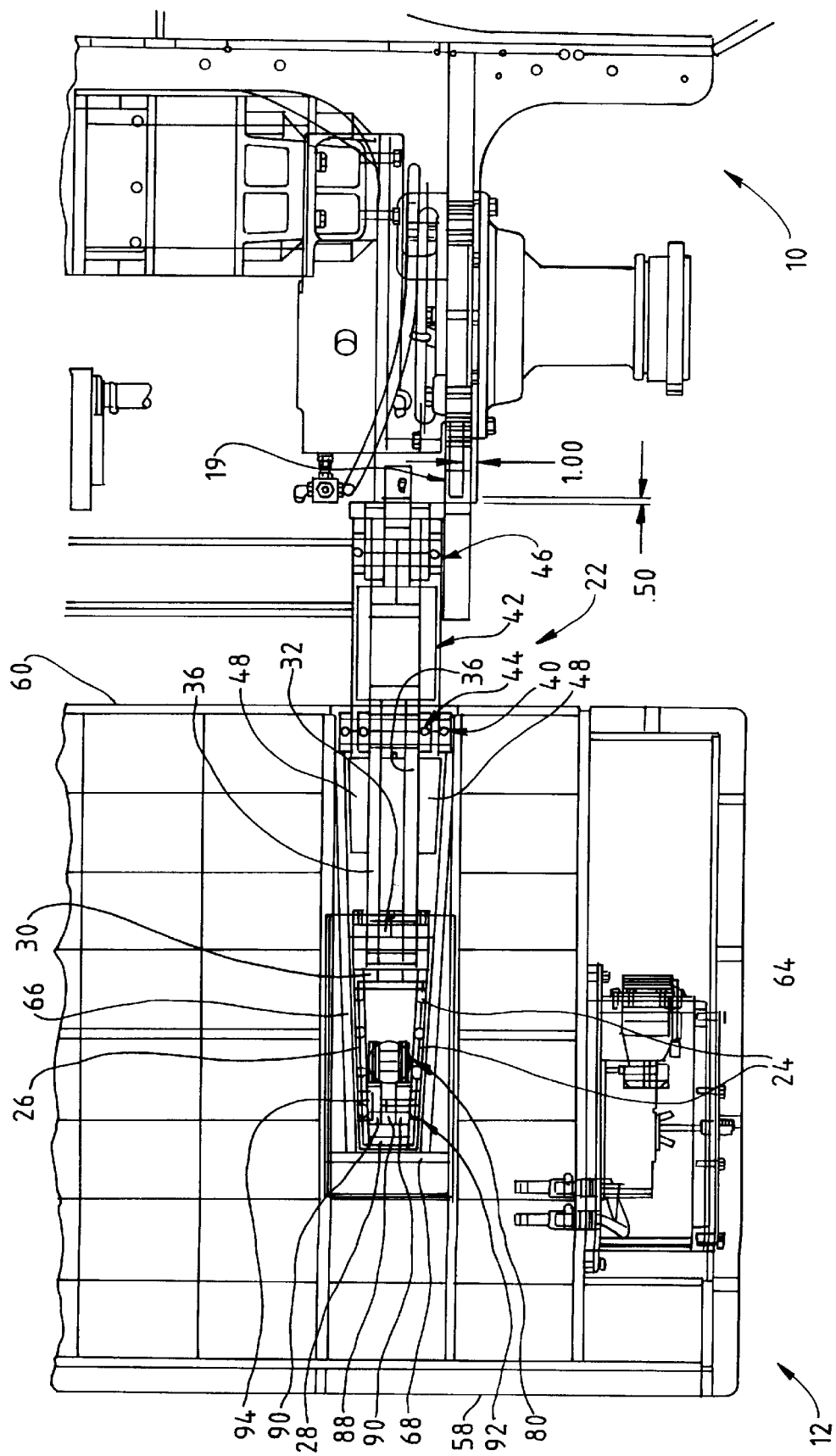
FIG. 3 is a partial top view of the system shown in FIG. 2.
Figure 4:
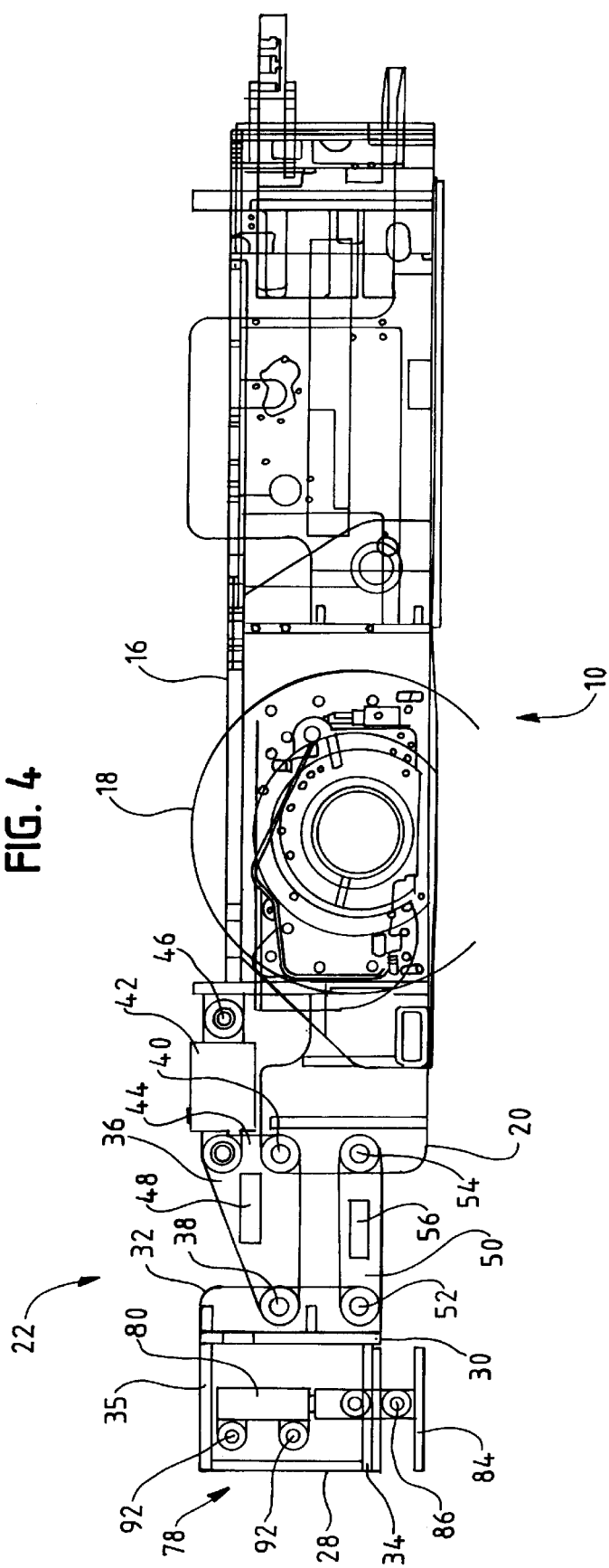
FIG. 4 is a side view of the vehicle shown in FIG. 2, but without the battery.

The battery lifting system 14 includes a pair of battery lifting arms 22 of which one is shown in FIGS. 1 and 2. FIG. 3 shows a top view of a portion of the vehicle 10 and battery 12 shown in FIGS. 1 and 2. FIG. 3 includes a top view of the battery lifting arm 22 shown in FIG. 1 and 2. The battery lifting arm 22 of FIGS. 1 and 2 is more clearly shown in FIG. 4 which is a side view of the vehicle 10 without the battery 12. The battery lifting arm 22 shown in FIG. 4 is shown in the raised position of FIG. 2.

Figure 5:
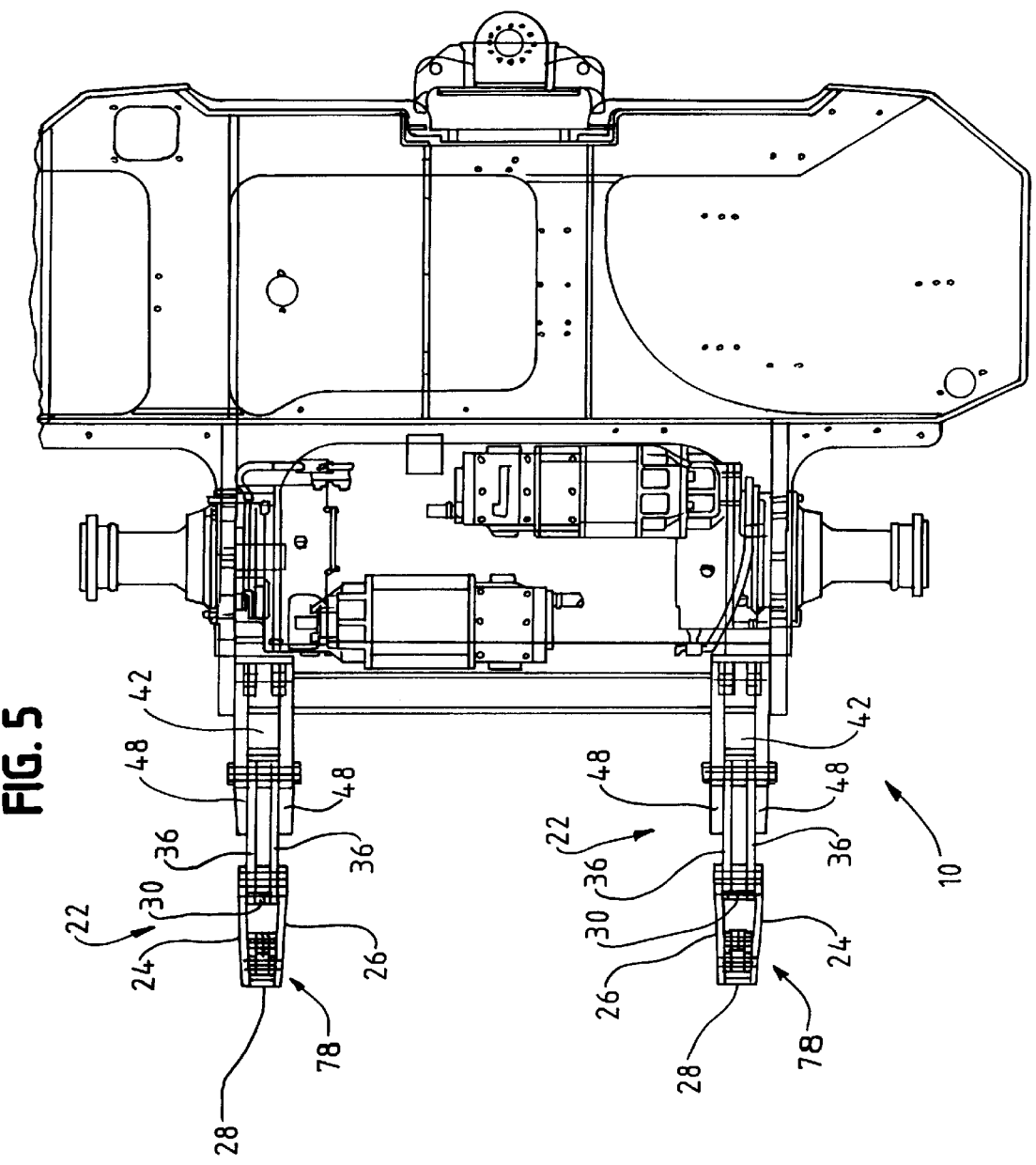
FIG. 5 is a top view of the vehicle similar to that of FIG. 3, but without the battery.
Figure 6:
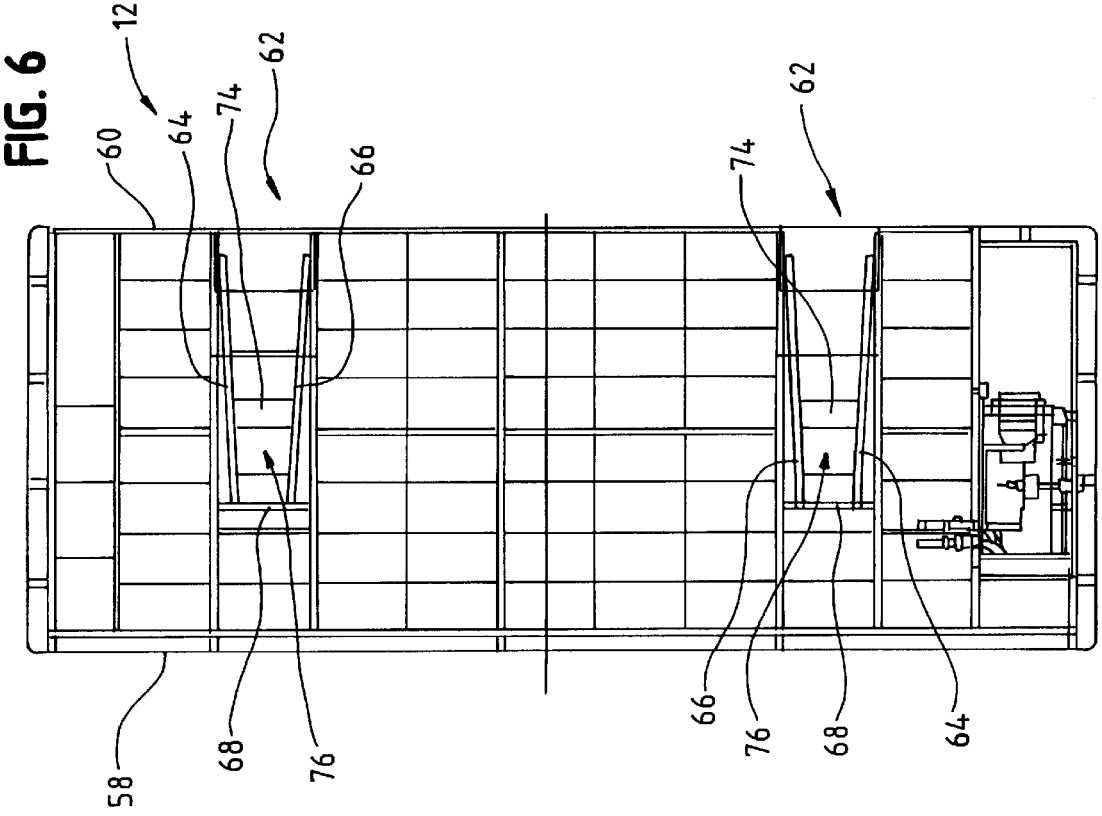
FIG. 6 is a top view of the battery similar to that of FIG. 3, but without the vehicle.

FIG. 5 shows a top view of the vehicle 10, without the tires 18, and without the battery 12. Both battery lifting arms 22 are shown in FIG. 5. As can be seen, the battery lifting arms 22 are a mirror image of one another. FIG. 6 is a cross-sectional top view of the battery 12.

Referring again to FIGS. 3, 4 and 5 it can be seen that each of the battery lifting arms 22 include opposing outer and inner sidewalls 24, 26 having a wedge-shaped profile as seen from the top view of FIG. 5. One side of the opposing sidewalls 24, 26 is closed off with a nose plate 28. Opposite of the nose plate 28, the opposing sidewalls 24, 26 are closed off with a plate 30 having a vertically extending support bracket 32. A support brace 34 is located at the bottom of the opposing sidewalls 24, 26 and a top plate 35 is located at the top of the opposing sidewalls 24, 26. A wedge-shaped profile can also include profiles which are cone-shaped, spherical-shaped, and other profiles wherein the distal portion or end is smaller than the proximal portion or end.

A bellcrank 36 has one end coupled to the vertical support bracket 32 via a pin 38. The other end of the bellcrank 36 is coupled to the extended frame bracket 20 via a pin 40 and to one end of a hydraulic lift cylinder 42 via a pin 44. The other end of the lift cylinder 42 is coupled to the extended frame bracket 20 via a pin 46.

As can be seen in FIGS. 4 and 5, the bellcranks 36 each include stabilizing abutments 48 having a wedge-shaped profile which coincide with the wedge-shaped profile of the opposing sidewalls 24, 26.

A leveling link 50 has one end coupled to the vertical support bracket 32 via a pin 52. The other end of the leveling link 50 is coupled to the extended frame bracket 20 via a pin 54.

As can be seen from FIGS. 4 and 5, the leveling links 50 each include stabilizing abutments 56 having a wedge-shaped profile which coincides with the wedge-shaped profile of the opposing sidewalls 24, 26 and the stabilizing abutments 48 of the bellcranks 36.

As will be appreciated, the hydraulic lifting cylinders 42 provide the means for raising and lowering the battery lifting arms 22.

As can be seen from FIG. 6, the battery 12 includes a first side 58 and a second side 60. The second side 60 includes two slots 62. Each slot 62 is formed in part by first and second opposing vertical walls 64, 66. The vertical walls 64, 66 extend towards convergence in a direction towards the first side 58. The slots 62 or vertical walls 64, 66 are closed off on one end by a stop plate 68. As seen from FIG. 2, the battery 12 also includes a top side 70 and a bottom side 72 which further close off the slots 62. Extending upward from the bottom side 72 and into the interior of each of the slots 62 is an abutment or locking plate 74.

The vertical walls 64, 66, stop plate 68, bottom side 72, and locking plate 74 define a locking recess 76 (FIG. 1). Referring particularly to FIGS. 4 and 5, it can be seen that the battery lifting arms 22 include a battery lock 78. The battery lock 78 includes a hydraulic locking cylinder 80 having a shaft 82 (FIG. 2). The shaft 82 extends through a passage (not shown) of the support brace 34. Lock plate 84 is pivotally secured to the end of the shaft 82 via a pin 86. FIG. 4 shows the shaft 82 and lock plate 84 in the retracted position, as well as the extended position. As can be seen with the shaft 82 in the retracted position, the lock plate 84 is below and immediately adjacent the support brace 34. The combination of the battery lock 78 and the recess 76 is a locking means to prevent withdrawal of the arms 22 from the slots 62.

With the shaft 82 in the extended position, the locking plate 84 extends substantially below the outer and inner sidewalls 26, 28 of the battery lifting arms 22 and also extends into the plane of the locking plate 74. Locking plate 84 becomes a latch member with respect to the locking plate 74.

The locking cylinder 80 includes mounting flanges 88 (FIGS. 2 and 3) which are secured to the sidewalls 24, 26 via spacers 90, hex bolts 92 and hex nuts 94.

Figure 7:
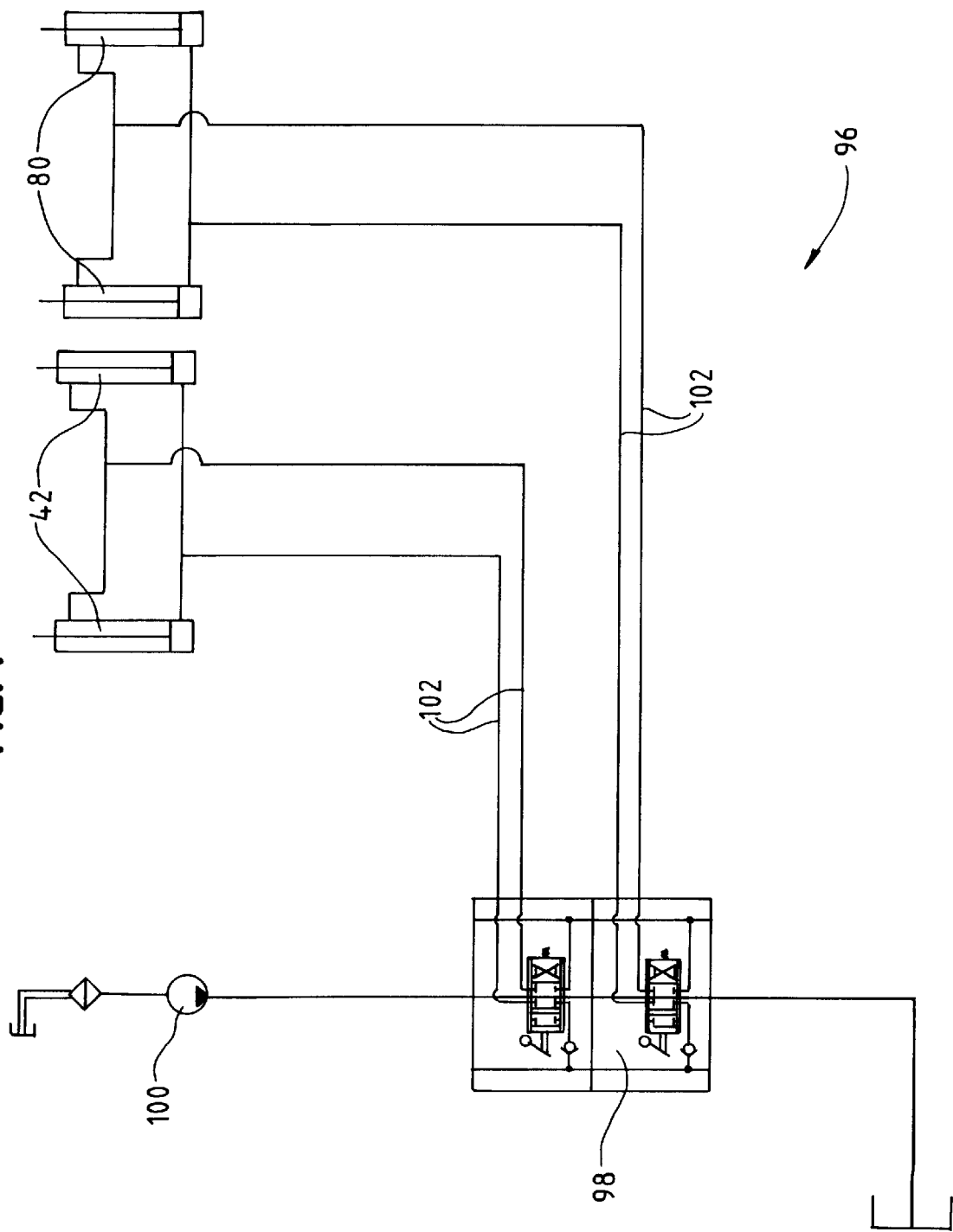
FIG. 7 is a schematic of the actuation system for the hydraulic cylinders of the present invention.

FIG. 7 depicts a schematic of the actuation system 96 for the pair of hydraulic lifting cylinders 42 and the hydraulic locking cylinders 80. As is known in the art, a controller 98 regulates hydraulic pressure created by pump 100. The regulated pressure is then transferred to the lifting cylinders 42 and locking cylinders 80 via hydraulic lines 102.

In operation, when it is desired to load a fully charged battery 12 onto the vehicle 10, the vehicle 10 will backup towards the battery 12 with the battery lifting arm 22 in the lowered position of FIG. 1 and with the locking plate 84 in the retracted position of FIG. 1. The vehicle 10 will move towards the battery 12 with the battery lifting arms 22 generally aligned with the respective slots 62 of the battery 12. The wedge-shaped profile of the slots 62 and the lifting arms 22 (i.e. outer and inner sidewalls 24, 26, alignment abutments 48, 56) will cause the battery 12 to shift from its resting position and align itself with the vehicle 10. The vehicle 10 will continue to move toward the battery 12 until the nose plates 28 of the lifting arms 22 come in contact with the respective stop-plates 68 of the battery 12. The battery lifting arms 22 will then be partially raised until the top plate 35 comes in contact with the top side 70 of the battery 12.

The locking cylinders 80 are then actuated to extend the shafts 82 so that the lock plates 84 extends into the respective locking recesses 76 and against the bottom side 72 of the battery 12. The lock plates 84 will be stationary with respect to the battery as the circumference of the lock plates 84 will each be surrounded and substantially engaged by the respective stop plate 68, walls 64, 66 and the abutment or locking plate 74. As a result, the battery will be securely locked to the vehicle 10 for battery lifting operations and during transport of the vehicle 10 and battery 12.

Extending the lock plates 84 against the bottom side 72 of the battery 12 also serves to additional align the battery 12 with the lifting arms 22. The pivotal connections of the lock plates 84 to the respective shaft 82 enhances the ability of the battery 12 to become aligned with the lifting arms 22.

The battery lifting arms 22 are then fully raised to the position of FIG. 2. The vehicle 10 is now ready to resume normal operations.

When it is time to unload the battery 12, the above outlined steps are carries out in reverse order.

What is claimed is:

1. A battery and battery lifting system for a mining or construction vehicle, the vehicle having a frame, the system comprising:

a battery;

an arm for lifting the battery, the lifting arm having means for pivotally coupling to the frame; and a means for aligning the battery with the lifting arm, the aligning means having a wedge-shaped profile, the aligning means includes vertical sidewalls in the battery, the vertical sidewalls extend toward convergence, each of the first and second lifting arms includes opposing outer and inner sidewalls, the opposing outer and inner sidewalls extend toward convergence in a direction away from the vehicle, whereby the battery is guided and aligned with the lifting arm as the lifting arm moves inwardly in the direction of convergence along the vertical sidewalls.

2. The battery and battery lifting system of claim 1, wherein the aligning means includes a slot in the battery for receiving the lifting arm, the slot having the vertical sidewalls which extend toward convergence, whereby the battery is guided and aligned with the lifting arm as the lifting arm moves inwardly in the direction of convergence along the vertical sidewalls.

3. The battery and battery lifting system of claim 1, further comprising a means for locking the battery to the lifting arm.

4. The battery and battery lifting system of claim 3, wherein the locking means includes a means for engaging the battery, the engaging means having a locked position wherein the engaging means is engaged with the battery, and an unlocked position wherein the engaging means is not engaged with the battery, whereby the engaging means is in the unlocked position while the battery is aligned with the lifting arm prior to lifting the battery, and the engaging means is in the locked position after alignment of the battery with the lifting arm.

5. The battery and battery lifting system of claim 1, wherein the battery includes a first side and a second side, the second side opposite from the first side, the second side having a slot extending substantially towards the first side, the slot having first and second opposing vertical sidewalls, the first and second opposing vertical sidewalls extend towards convergence in a direction towards the first side; and wherein the lifting arm is wedge-shaped and adapted to be inserted into the slot of the battery.

6. The battery and battery lifting system of claim 5, wherein the slot includes a locking recess, and the lifting arm includes a hydraulic cylinder with a shaft, the shaft having a retracted position and an extended position, the shaft being adapted to fit in the locking recess, whereby the shaft is in the retracted position during alignment of the lifting arms with the slot, and the shaft being in the extended position and in the locking recess after alignment to lock the battery to the lifting arm.

7. A battery and battery lifting system for a mining or construction vehicle, the vehicle having a frame, the system comprising:

a battery, the battery having a first side and a second side, the second side opposite from the first side, the second side having a first and second slot, each slot substantially extending towards the first side, each slot having a distal end and a proximal end, the proximal end of the slot being adjacent the second side and the distal end of the slot being adjacent the first side, each of the first and second slot having first and second opposing vertical walls, each of the first and second opposing vertical walls extending towards convergence in the direction towards the first side, and a first and second lifting arm, each of said first and second lifting arms being pivotally coupled to the frame and adapted to be inserted into a respective one of the first and second slots of the battery, each of the first and second lifting arms includes opposing outer and inner sidewalls, the opposing outer and inner sidewalls extend toward convergence in a direction away from the vehicle, whereby the first and second opposing vertical walls align the battery with the first and second lifting arms as the first and second lifting arms are inserted into the first and second slots along the first and second opposing vertical walls.

8. The battery and battery lifting system of claim 7, further comprising a locking cylinder secured between the opposing outer and inner sidewalls, the locking cylinder having a shaft extending downwardly, the shaft having a distal end, a locking plate secured to the distal end, the shaft and locking plate having a retracted position and an extended position, in the extended position the locking plate extends below the opposing inner and outer sidewalls, a bellcrank having a first end pivotally coupled to the opposing inner and outer sidewalls and a second end pivotally coupled to the frame, the bellcrank having inner and outer stabilizing abutments having a profile which coincides with the converging opposing outer and inner sidewalls, a lift cylinder having a first end pivotally coupled to the second end of the bellcrank and a second end pivotally coupled to the frame, and a leveling link having a first end pivotally coupled to the inner and outer sidewalls and a second end pivotally coupled to the frame, the leveling link having inner and outer stabilizing abutments having a profile which coincides with the converging opposing outer and inner sidewalls; and wherein at least one of the first and second slots includes a locking recess, each locking recess is located substantially below the opposing sidewalls.

9. The battery and battery lifting system of claim 8, wherein each of the first and second slots includes a stop plate secured to the respective pair of first and second opposing vertical walls at the distal end of the slot, the stop plate extending into the locking recess, and wherein the locking recess includes an abutment plate spaced from the stop plate in a direction towards the second side of the battery, whereby the stop plate defines the depth in which the lifting arms enter the battery and together with the abutment plate, defines a recess for receiving the locking plate and limiting movement of the locking plate between the stop plate and the abutment plate with the locking plate in the extended position.

10. A battery for use with a mining or construction-vehicle, the vehicle having a frame and and at least one lifting arm pivotally coupled to the frame, each of the at least one lifting arms includes opposing outer and inner sidewalls, the opposing outer and inner sidewalls extend toward convergence in a direction away from the vehicle, the battery comprising:

a first side; and a second side, the second side opposite from the first side, the second side having a slot extending towards the first side, the slot having first and second opposing vertical walls, the first and second opposing vertical walls extend towards convergence in the direction towards the first side, whereby the lifting arm is adapted to be inserted into the slot of the battery, and the convergence of the first and second vertical walls aligns the lifting arm as the lifting arm is inserted into the slot prior to lifting the battery.

11. The battery of claim 10, wherein the slot includes a locking means recess for preventing withdrawal of the lifting arm from the slot.

12. A battery lifting apparatus for lifting and handling a battery of a mining or construction vehicle, the vehicle having a frame, the battery having a slot, the slot having vertical sidewalls which extend toward convergence, the apparatus comprising:

at least one wedge-shaped lifting arm, each of the at least one wedge-shaped lifting arms includes opposing outer and inner sidewalls, the opposing outer and inner sidewalls extend toward convergence in a direction away from the vehicle, the wedge-shaped lifting arm includes means for pivotally coupling to the frame, the wedge-shaped lifting arm is adapted to be inserted into the slot of the battery, whereby the wedge shape of the arm aligns the lifting arm as the lifting arm is inserted into the slot prior to lifting the battery.

13. The battery lifting apparatus of claim 12, wherein the wedge-shaped lifting arm includes a hydraulic cylinder with a shaft, the shaft having a retracted position and an extended position, whereby with the shaft in the retracted position, the lifting arm is inserted into the slot of the battery, whereupon the shaft is moved to the extended position and into locking engagement with the battery.

* * * * *